US 11,541,494 B2

(12) United States Patent
Kimura

(10) Patent No.: US 11,541,494 B2
(45) Date of Patent: Jan. 3, 2023

(54) CONVEYANCE DEVICE

(71) Applicant: DMG MORI CO., LTD., Yamatokoriyama (JP)

(72) Inventor: Taketo Kimura, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 125 days.

(21) Appl. No.: 16/644,104

(22) PCT Filed: Aug. 30, 2018

(86) PCT No.: PCT/JP2018/032073
§ 371 (c)(1),
(2) Date: Mar. 3, 2020

(87) PCT Pub. No.: WO2019/044956
PCT Pub. Date: Mar. 7, 2019

(65) Prior Publication Data
US 2020/0189055 A1 Jun. 18, 2020

(30) Foreign Application Priority Data
Sep. 4, 2017 (JP) .............................. JP2017-169427

(51) Int. Cl.
*B23Q 3/157* (2006.01)
*B23Q 3/155* (2006.01)
*B23Q 11/08* (2006.01)

(52) U.S. Cl.
CPC .......... *B23Q 3/15539* (2016.11); *B23Q 3/157* (2013.01); *B23Q 3/15533* (2013.01);
(Continued)

(58) Field of Classification Search
CPC ......... Y10T 483/115; Y10T 409/30392; Y10T 483/1717; Y10T 483/175; Y10T 483/1891;
(Continued)

(56) References Cited
U.S. PATENT DOCUMENTS 1,507,746 A * 9/1924 Malsin ...................... A47F 3/10
312/125
2,736,628 A * 2/1956 Fadden, Jr. .......... A47B 81/007
211/1.55
(Continued)

FOREIGN PATENT DOCUMENTS
CN 101815597 A 8/2010
EP 1493531 A1 * 1/2005
(Continued)

OTHER PUBLICATIONS
Machine translation of EP 1493531, which EP '531 was published Jan. 2005.*
(Continued)

*Primary Examiner* — Erica E Cadugan
(74) *Attorney, Agent, or Firm* — Oblon, McClelland, Maier & Neustadt, L.L.P.

(57) ABSTRACT

A tool magazine as a conveyance device includes a first conveyance unit that conveys a plurality of tools along a first route, a second conveyance unit that conveys a plurality of tools along a second route, and a cover body. A first opening used to attach and detach the tool in a first section of first route and a second opening used to attach and detach the tool a third section of second route are provided in cover body. A second section of first route is located between first section of first route and second conveyance unit in a direction in which first conveyance unit and second conveyance unit are arranged. A fourth section of second route is located between third section of second route and first conveyance unit in the direction in which first conveyance unit and second conveyance unit are arranged.

8 Claims, 11 Drawing Sheets

(52) U.S. Cl.
CPC .......... *B23Q 3/15724* (2016.11); *B23Q 11/08* (2013.01); *Y10T 483/115* (2015.01); *Y10T 483/1845* (2015.01); *Y10T 483/1891* (2015.01)

(58) Field of Classification Search
CPC . Y10T 483/179–1795; Y10T 483/1845–1855; B23Q 3/15533; B23Q 3/155–3/15793; B23Q 11/08–11/0891; B23Q 3/15539; B23Q 7/02; B23Q 7/03–7/035; B23Q 3/15724; B23Q 3/15506; B23Q 3/15706; B65G 1/127
USPC .................. 483/3, 23, 37, 63–64, 68, 54–56; 409/134; 451/451–457; 144/251.1–251.3; 211/1.52–1.56
See application file for complete search history.

(56) References Cited

U.S. PATENT DOCUMENTS

| | | | |
|---|---|---|---|
| 4,070,973 A * | 1/1978 | Morgan | A47F 5/025 211/1.55 |
| 4,643,107 A * | 2/1987 | Gunn | G07F 9/06 109/48 |
| 8,210,907 B2 | 7/2012 | Walter et al. | |
| 2003/0115736 A1* | 6/2003 | Kurz | B23Q 39/00 483/1 |
| 2010/0210190 A1 | 8/2010 | Walter et al. | |

FOREIGN PATENT DOCUMENTS

| | | |
|---|---|---|
| JP | 1-257551 A | 10/1989 |
| JP | 2012-125904 A | 7/2012 |
| JP | 2015-205376 A | 11/2015 |
| WO | WO-00/66317 A1 * | 11/2000 |
| WO | WO 2005/120768 A2 | 12/2005 |

OTHER PUBLICATIONS

Machine Translation of WO 00/66317-A1, which WO '317 was published Nov. 2000.*
International Search Report dated Oct. 23, 2018 in PCT/JP2018/032073 filed Aug. 30, 2018, 1 page.

* cited by examiner

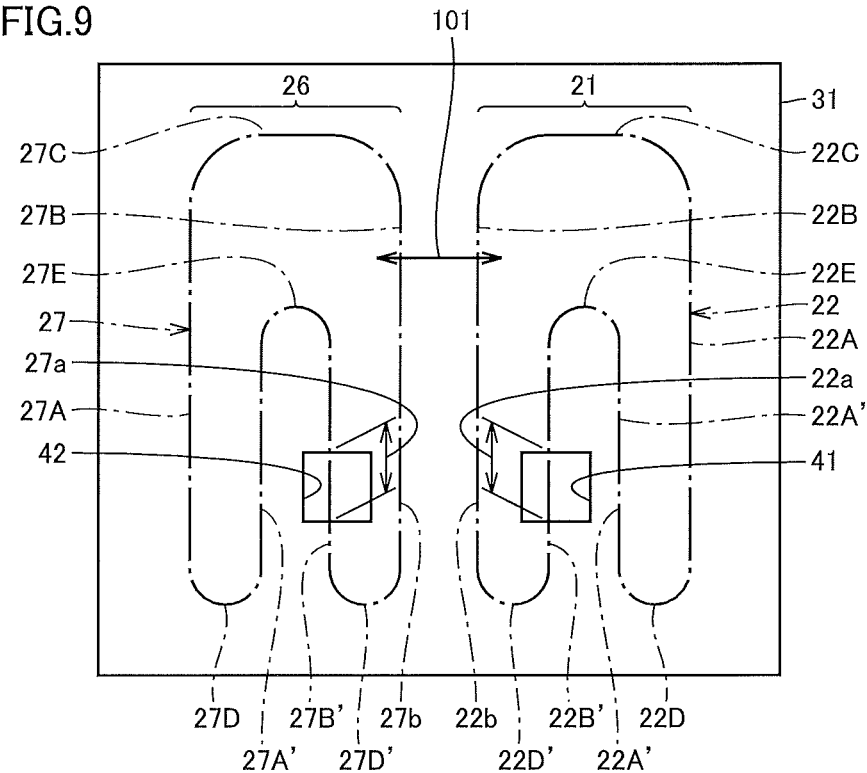
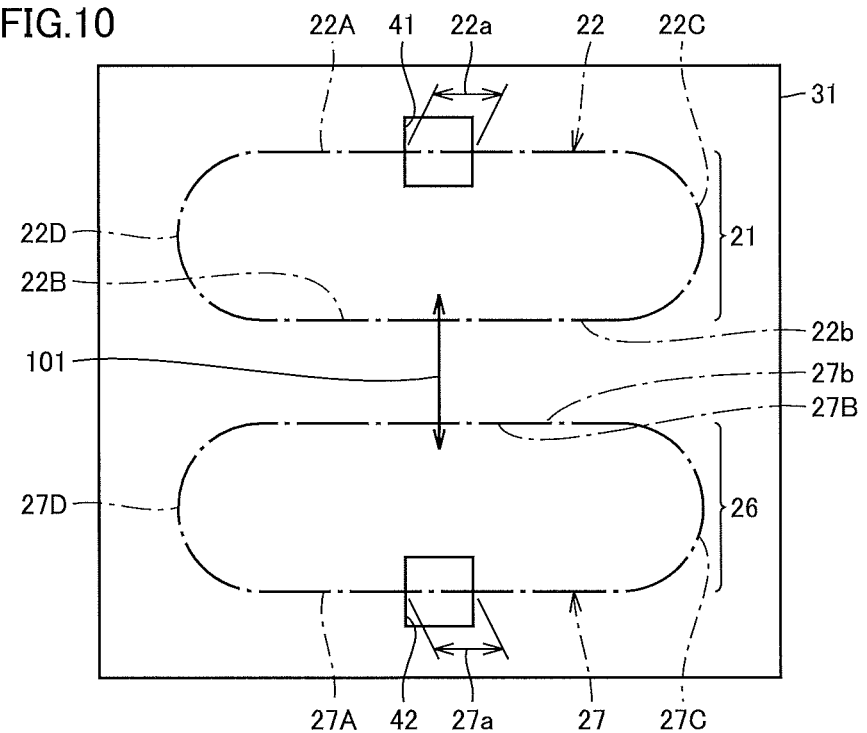

CONVEYANCE DEVICE

TECHNICAL FIELD

The present invention relates to a conveyance device.

BACKGROUND ART

There is known a conveyance device including a plurality of conveyance units. In each conveyance unit, a plurality of conveyance objects are detachably held, and the plurality of held conveyance objects are conveyed. For example, a machine tool disclosed in Japanese Patent Laying-Open No. 1-257551 (PTL 1) includes three tool magazines that store a large number of tools while separating the tools for each process, the three tool magazines being configured independently of one another.

CITATION LIST

Patent Literature

PTL 1: Japanese Patent Laying-Open No. 1-257551

SUMMARY OF INVENTION

Technical Problem

In the conveyance device, there is a scene in which the conveyance object is manually attached and detached for a purpose of exchange of the conveyance object. However, when the conveyance object is conveyed in one of the plurality of conveyance units, the conveyance object is hardly attached and detached in other conveyance units adjacent to the conveyance unit while safety of an operator is ensured. As a result, efficient work is hindered because restriction is generated in timing of attaching and detaching the conveyance object.

An object of the present invention is to solve the above problem, and to provide a conveyance device capable of efficiently performing the work to attach and detach the conveyance object.

Solution to Problem

According to one aspect of the present invention, a conveyance device includes: a first conveyance unit configured to detachably hold a plurality of conveyance objects and convey the plurality of conveyance objects along an endless loop-shaped first route; a second conveyance unit provided side by side with the first conveyance unit, the second conveyance unit detachably holding a plurality of conveyance objects and conveying the plurality of conveyance objects along an endless loop-shaped second route; and a cover body forming a space in which the first conveyance unit and the second conveyance unit are accommodated The first route includes a first section and a second section. The second route includes a third section and a fourth section. A first opening used to attach and detach each of the conveyance objects to and from the first conveyance unit in the first section and a second opening used to attach and detach each of the conveyance objects to and from the second conveyance unit in the third section are provided in the cover body. The second section is located between the first section and the second conveyance unit in a direction in which the first conveyance unit and the second conveyance unit are arranged. The fourth section is located between the third section and the first conveyance unit in the direction in which the first conveyance unit and the second conveyance unit are arranged.

According to another aspect of the present invention, a conveyance device includes: a first conveyance unit configured to detachably hold a plurality of conveyance objects and convey the plurality of conveyance objects along an endless loop-shaped first route; a second conveyance unit provided side by side with the first conveyance unit, the second conveyance unit detachably holding a plurality of conveyance objects and conveying the plurality of conveyance objects along an endless loop-shaped second route; and a cover body forming a space in which the first conveyance unit and the second conveyance unit are accommodated A first opening used to attach and detach each of the conveyance objects to and from the first conveyance unit and a second opening used to attach and detach each of the conveyance objects to and from the second conveyance unit are provided in the cover body. The first opening is provided to be shifted from the first route onto a side far from the second conveyance unit in a direction in which the first conveyance unit and the second conveyance unit are arranged. The second opening is provided to be shifted from the second route onto a side far from the first conveyance unit in the direction in which the first conveyance unit and the second conveyance unit are arranged.

Advantageous Effects of Invention

The present invention can provide the conveyance device capable of efficiently performing the work to attach and detach the conveyance objects.

BRIEF DESCRIPTION OF DRAWINGS

FIG. 9 is a front view illustrating a third modification of the layout of the first conveyance unit and the second conveyance unit in FIG. 4 and the positions of the first opening and the second opening.

FIG. 10 is a front view illustrating a fourth modification of the layout of the first conveyance unit and the second conveyance unit in FIG. 4 and the positions of the first opening and the second opening.

DESCRIPTION OF EMBODIMENT

Figure 1:
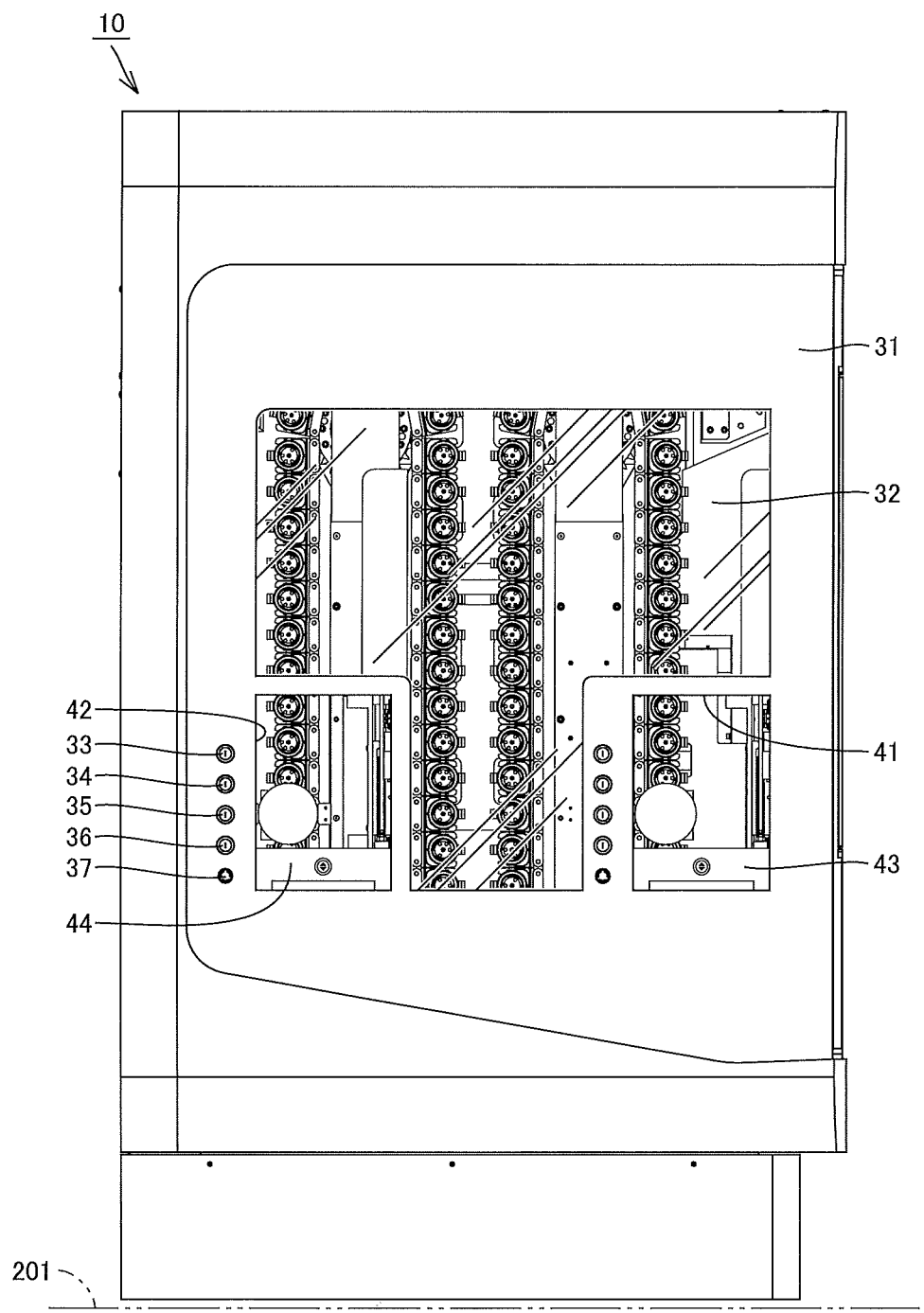
FIG. 1 is a front view illustrating a tool magazine according to a first embodiment of the present invention.

An embodiment of the present invention will be described with reference to the drawings. In the drawings referred to below, the same or corresponding member is denoted by the same reference numeral.

First Embodiment

Figure 2:
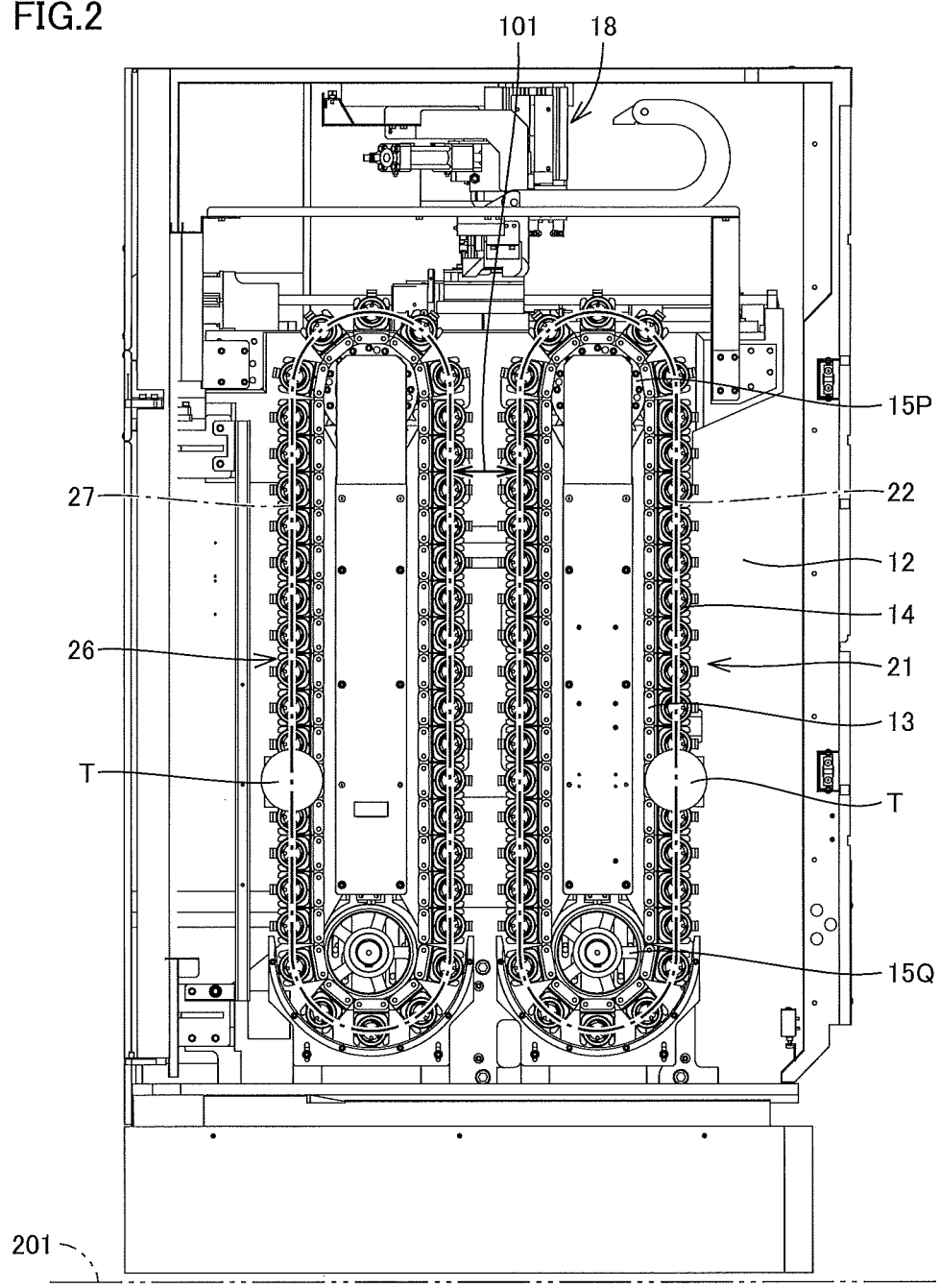
FIG. 2 is a front view illustrating an inside of the tool magazine in FIG. 1.
Figure 3:
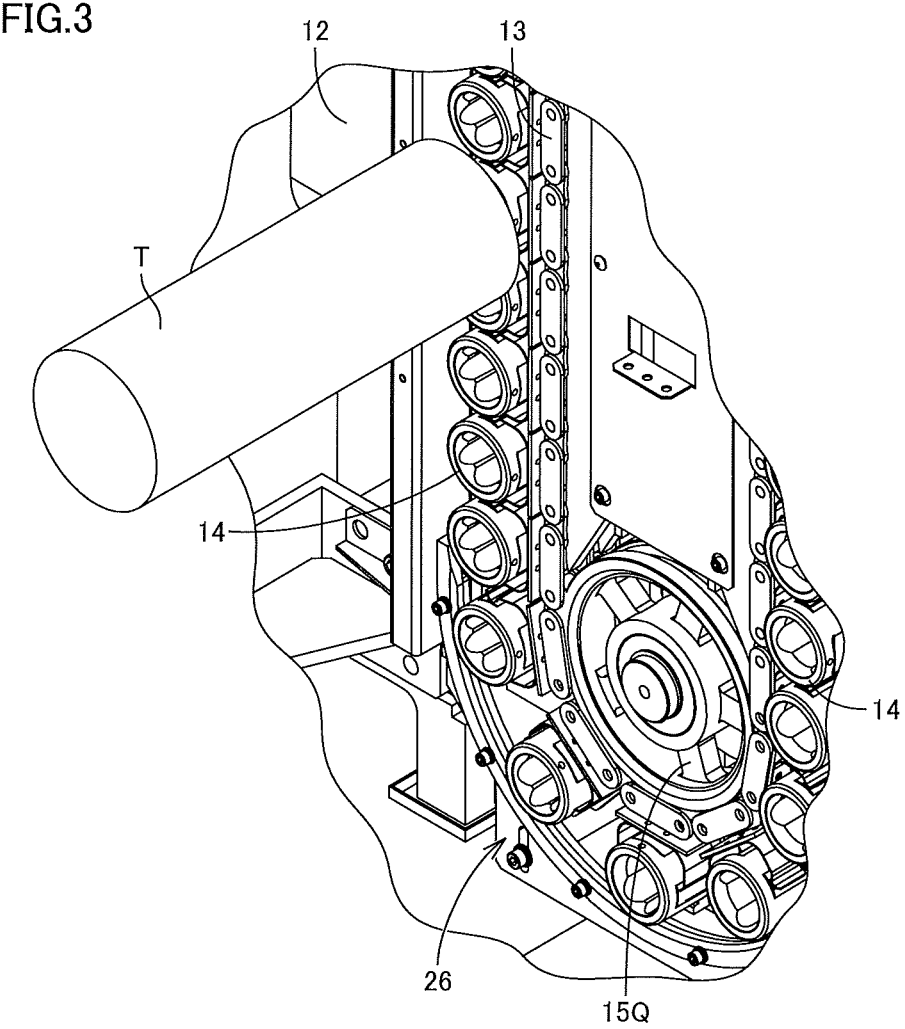
FIG. 3 is a perspective view illustrating a tool conveyance structure in the tool magazine in FIG. 1.

FIG. 1 is a front view illustrating a tool magazine according to a first embodiment of the present invention. FIG. 2 is a front view illustrating an inside of the tool magazine in FIG. 1. FIG. 3 is a perspective view illustrating a tool conveyance structure in the tool magazine in FIG. 1.

With reference to FIGS. 1 to 3, a tool magazine 10 of the first embodiment is a device that stores a plurality of tools in order to sequentially supply tools to a machining area according to a machining purpose in various machining tools (for example, a machining center or a combined machining machine).

A drill mounted on a tool spindle and rotating tools such as an end mill and a milling cutter are stored in tool magazine 10. A fixed tool used for turning may be stored in tool magazine 10.

Tool magazine 10 is installed on a floor surface 201 of a factory or the like. Tool magazine 10 includes a magazine base 12, a first conveyance unit 21, a second conveyance unit 26, and a cover body 31.

Magazine base 12 is provided as a base member of tool magazine 10. First conveyance unit 21 and second conveyance unit 26 are supported by magazine base 12. Cover body 31 forms an appearance of tool magazine 10 when tool magazine 10 is viewed from the front. Cover body 31 forms a space in which first conveyance unit 21 and second conveyance unit 26 are accommodated. Cover body 31 forms the space in which first conveyance unit 21 and second conveyance unit 26 are accommodated together with magazine base 12.

First conveyance unit 21 is configured to detachably hold a plurality of tools (a tool T in the drawings). First conveyance unit 21 is configured to convey the plurality of tools along an endless loop-shaped first route 22. Second conveyance unit 26 is configured to detachably hold a plurality of tools (tool T in the drawings). Second conveyance unit 26 is configured to convey the plurality of tools along an endless loop-shaped second route 27.

Second conveyance unit 26 is provided independently of first conveyance unit 21. Second conveyance unit 26 is provided side by side with first conveyance unit 21. Second conveyance unit 26 is provided side by side with first conveyance unit 21 in one horizontal direction. Second conveyance unit 26 is provided side by side with first conveyance unit 21 in a direction parallel to a plane on which a conveyance chain 13 (to be described later) is disposed in a loop shape. Second conveyance unit 26 is provided side by side with first conveyance unit 21 in a direction indicated by an arrow 101 in FIG. 2 (hereinafter, the direction indicated by arrow 101 in FIG. 2 is also referred to as "a direction in which first conveyance unit 21 and second conveyance unit 26 are arranged").

As a representative example, a tool group used to machine different workpieces is stored in first conveyance unit 21 and second conveyance unit 26.

First conveyance unit 21 (second conveyance unit 26) includes conveyance chain 13, a plurality of tool pots 14, a driving sprocket 15P, a driven sprocket 15Q, and a motor (not illustrated).

Driving sprocket 15P and driven sprocket 15Q are disposed with a vertical interval. An output shaft of the motor is connected to driving sprocket 15P with a speed reducer interposed therebetween. Conveyance chain 13 is disposed in the loop shape. Conveyance chain 13 is bridged between driving sprocket 15P and driven sprocket 15Q.

The plurality of tool pots 14 are supported by conveyance chain 13. The plurality of tool pots 14 are provided at equal pitches along loop-shaped conveyance chain 13. The plurality of tool pots 14 are provided outside loop-shaped conveyance chain 13. Tool pot 14 has a cylindrical shape capable of receiving the tool. A holding mechanism that detachably holds the tool by spring force or the like is incorporated in tool pot 14.

An axial center of the tool (an axial center of a shank portion of the tool) coincides with a center axis of tool pot 14 while the tool is held by tool pot 14. While the tool is held by tool pot 14, the axial center of the tool is orthogonal to the plane on which conveyance chain 13 is disposed in the loop shape.

When rotation is transmitted from the motor to driving sprocket 15P, driving sprocket 15P rotates. Conveyance chain 13 moves in a circumferential direction with the rotation of driving sprocket 15P, whereby the tool held by tool pot 14 is conveyed along first route 22 in first conveyance unit 21 while the tool held by tool pot 14 is conveyed along second route 27 in second conveyance unit 26.

Figure 4:
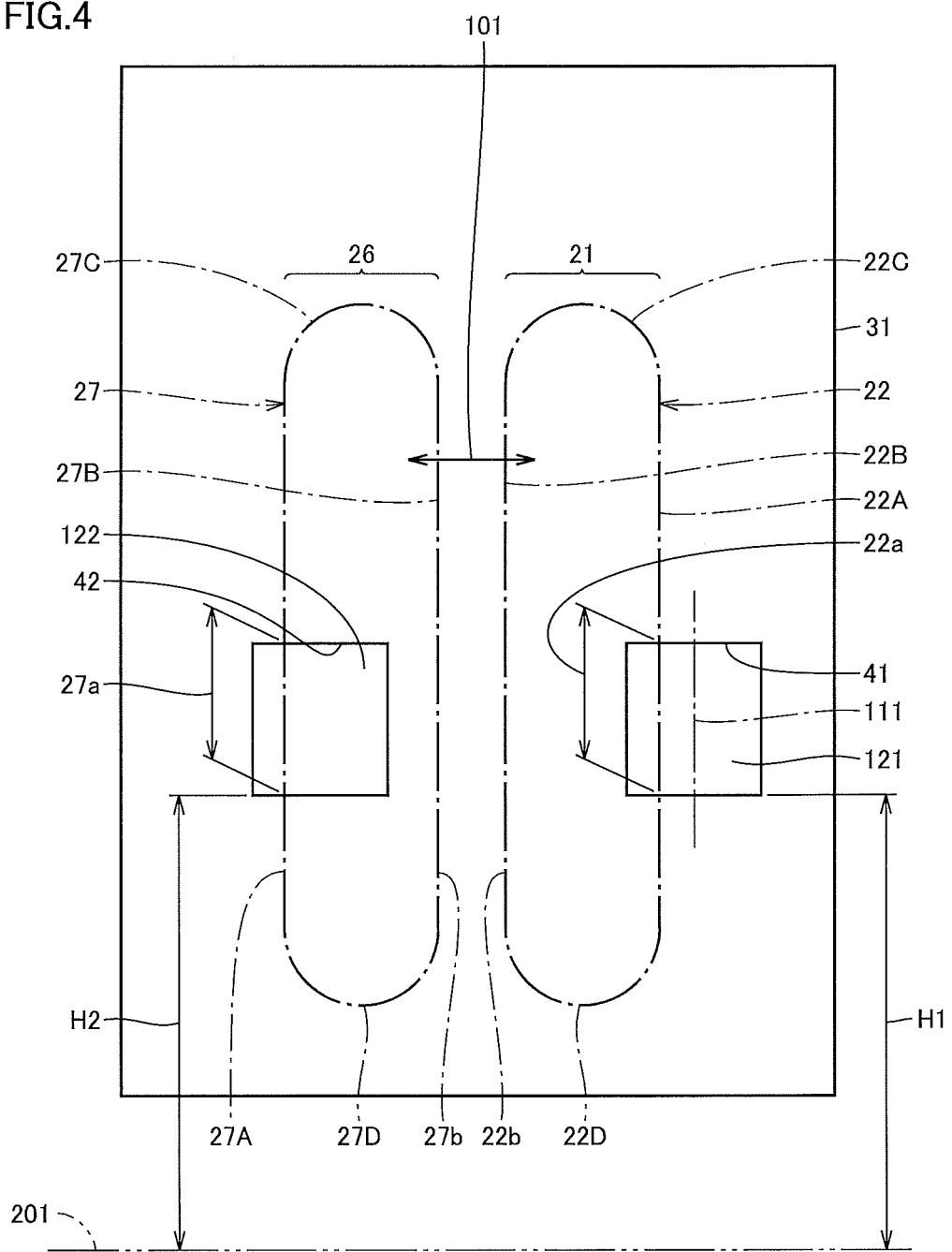
FIG. 4 is a front view illustrating a positional relationship between a tool conveyance route and an opening provided in a cover body.

FIG. 4 is a front view illustrating a positional relationship between a tool conveyance route and an opening provided in a cover body.

With reference to FIGS. 1 to 4, first route 22 and second route 27 are illustrated as a trajectory about the axial center of the tool held by tool pot 14. First route 22 and second route 27 extend in a loop shape on an outside of conveyance chain 13 having the loop shape.

First route 22 and second route 27 have the same shape. First route 22 and second route 27 have a vertically long shape in which a vertical direction becomes a longitudinal direction while a horizontal direction becomes a short direction. First route 22 and second route 27 have a track shape.

More specifically, first route 22 includes a straight portion 22A, a straight portion 22B, an inversion portion 22C, and an inversion portion 22D as a constituent region thereof. Straight portion 22A and straight portion 22B extend in parallel with each other. Straight portion 22A and straight portion 22B extend in a vertical direction. Inversion portion 22C and inversion portion 22D extend in a semicircular shape. Inversion portion 22C connects upper ends of straight portion 22A and straight portion 22B. Inversion portion 22D connects lower ends of straight portion 22A and straight portion 22B. In inversion portion 22C and inversion portion 22D, the tool conveyance direction is inversed by 180°. The tool conveyance direction in straight portion 22A is opposite to the tool conveyance direction in straight portion 22B.

Second route 27 includes a straight portion 27A, a straight portion 27B, an inversion portion 27C, and an inversion portion 27D as a constituent region thereof. Straight portion 27A and straight portion 27B extend in parallel with each other. Straight portion 27A and straight portion 27B extend in the vertical direction. Inversion portion 27C and inversion portion 27D extend in a semicircular shape. Inversion portion 27C connects upper ends of straight portion 27A and straight portion 27B. Inversion portion 27D connects lower ends of straight portion 27A and straight portion 27B. Inversion portion 27C and inversion portion 27D, the tool conveyance direction is inversed by 180°. The tool conveyance direction in straight portion 27A is opposite to the tool conveyance direction in straight portion 27B.

In the direction in which first conveyance unit 21 and second conveyance unit 26 are arranged, straight portion 22B of first route 22 and straight portion 27B of second route 27 are disposed adjacent to each other. Straight portion 22B of first route 22 is disposed between straight portion 22A of first route 22 and straight portion 27B of second route 27. Straight portion 27B of second route 27 is disposed between straight portion 27A of second route 27 and straight portion 22B of first route 22.

The top of first route 22 (the top of inversion portion 22C) corresponds to a tool calling position where the tool supplied from first conveyance unit 21 to the machining area is positioned. The top of second route 27 (the top of inversion portion 27C) corresponds to a tool calling position where the tool supplied from second conveyance unit 26 to the machining area is positioned.

The tool supplied from first conveyance unit 21 to the machining area is conveyed from the current position of the tool along first route 22, and positioned at the tool calling position. At this point, one of a forward direction and a reverse direction along first route 22 is selected as the tool conveyance direction such that a conveyance distance from the current position of the tool to the tool calling position becomes shorter. The tool positioned at the tool calling position is mounted on a tool spindle in the machining area using a predetermined tool conveyance mechanism 18 and an automatic tool changer (not illustrated). The tool held by second conveyance unit 26 is also mounted on the tool spindle in the machining area in the same process as the tool held by first conveyance unit 21.

First route 22 includes a first section 22a and a second section 22b. First section 22a is a section of a part of first route 22. First section 22a corresponds to a part of straight portion 22A. First section 22a is located at a position closer to inversion portion 22D than inversion portion 22C is in the vertical direction. Second section 22b is a section of a part of first route 22, and is located away from first section 22a. Second section 22b corresponds to straight portion 22B. In the direction in which first conveyance unit 21 and second conveyance unit 26 are arranged, second section 22b is located between first section 22a and second conveyance unit 26.

A first opening 41 is provided in cover body 31 in order to attach and detach the tool to and from first conveyance unit 21 in first section 22a. First opening 41 is formed of a through-hole penetrating cover body 31. First opening 41 is provided opposite first section 22a in an axial direction of the tool.

Second route 27 includes a third section 27a and a fourth section 27b. Third section 27a is a section of a part of second route 27. Third section 27a corresponds to a part of straight portion 27A. Third section 27a is located at a position closer to inversion portion 27D than inversion portion 27C is in the vertical direction. Fourth section 27b is a section of a part of second route 27, and is located away from third section 27a. Fourth section 27b corresponds to straight portion 27B. In the direction in which first conveyance unit 21 and second conveyance unit 26 are arranged, fourth section 27b is located between third section 27a and first conveyance unit 21.

A second opening 42 is provided in cover body 31 in order to attach and detach the tool to and from second conveyance unit 26 in third section 27a. Second opening 42 is formed of a through-hole penetrating cover body 31. Second opening 42 is provided opposite third section 27a in the axial direction of the tool.

Each of first opening 41 and second opening 42 includes a rectangular opening surface. First opening 41 and second opening 42 are provided at the same level. A height H1 of first opening 41 with respect to floor surface 201 is equal to a height H2 of second opening 42 with respect to floor surface 201 (H1=H2). When first opening 41 and second opening 42 are provided at the same level, a condition of work to attach and detach the tool to and from first conveyance unit 21 and a condition of work to attach and detach the tool to and from second conveyance unit 26 become closer to each other, whereby the operator easily performs the work to attach and detach the tool.

Cover body 31 includes a window 32, a first door 43, and a second door 44. Window 32 is provided opposite first conveyance unit 21 and second conveyance unit 26. The operator can visually recognize the inside of cover body 31 through window 32. First door 43 is provided so as to be capable of opening and closing first opening 41. Second door 44 is provided so as to be capable of opening and closing second opening 42. First door 43 and second door 44 are provided so as to be slidable in the vertical direction.

An interlock mechanism is provided in first door 43 and second door 44. The operation of first door 43 from a closed state to an open state is restricted while the workpiece machining is performed using a tool group stored in first conveyance unit 21. The operation of second door 44 from the closed state to the open state is restricted while the workpiece machining is performed using the tool group stored in second conveyance unit 26.

A plurality of operation buttons 33 to 37 are provided in cover body 31. The plurality of operation buttons 33 to 37 are provided corresponding to first conveyance unit 21 and second conveyance unit 26. The plurality of operation buttons 33 to 37 are provided at positions adjacent to first opening 41 and second opening 42.

Operation button 35 is an operation unit that switches the tool conveyance in first conveyance unit 21 or second conveyance unit 26 to a manual mode. Operation button 33 is an operation unit that conveys the tool in the forward direction in the manual mode. Operation button 34 is an operation unit that conveys the tool in the reverse direction in the manual mode. Operation button 36 is an operation unit that automatically releases the tool from tool pot 14. Operation button 37 is an operation unit that stops the tool conveyance in an emergency.

For example, it is assumed that the tool group used in a machining process A is stored in first conveyance unit 21, that the tool group used in a machining process B is stored in second conveyance unit 26, and that the workpiece machining proceeds in the order of machining process A, machining process B, a machining process C, and a machining process D. In this case, it is considered that while machining process A is completed and machining process B is in progress, a tooling exchange from the tool group used in machining process A to the tool group used in machining process C is performed in first conveyance unit 21. It is also considered that while machining process B is completed and machining process C is in progress, a tooling exchange from the tool group used in machining process B to the tool group used in machining process D is performed in second conveyance unit 26.

In such cases, the operator exchanges the tool stored in first conveyance unit 21 to another tool through first opening 41, and exchanges the tool stored in second conveyance unit 26 to another tool through second opening 42.

Representatively, the case where the tool stored in first conveyance unit 21 is exchanged will be described. The operator presses operation button 35 to switch the tool conveyance in first conveyance unit 21 to the manual mode. Subsequently, the operator opens first door 43 to put first opening 41 in the open state. Subsequently, the operator presses operation button 33 or operation button 34 to convey the tool to be exchanged to first section 22a. Subsequently, the operator presses operation button 36 to remove the tool to be exchanged from tool pot 14. Subsequently, the operator mounts a new tool on tool pot 14. Finally, the operator completes the tooling exchange operation by closing first door 43.

In tool magazine 10 of the first embodiment, in the direction in which first conveyance unit 21 and second conveyance unit 26 are arranged, second section 22b of first conveyance unit 21 is located between first section 22a of first conveyance unit 21 in which first opening 41 is provided and second conveyance unit 26. For this reason, even when the tool stored in first conveyance unit 21 is exchanged in timing of conveying the tool in second conveyance unit 26, the hand of the operator hardly reaches second conveyance unit 26 from first opening 41.

In the direction in which first conveyance unit 21 and second conveyance unit 26 are arranged, fourth section 27b of second conveyance unit 26 is located between third section 27a of second conveyance unit 26 in which second opening 42 is provided and first conveyance unit 21. For this reason, even when the tool stored in second conveyance unit 26 is exchanged in timing of conveying the tool in first conveyance unit 21, the hand of the operator hardly reaches first conveyance unit 21 from second opening 42.

Thus, even while the tool is conveyed in one of first conveyance unit 21 and second conveyance unit 26, the operator can perform the work to attach and detach the tool in the other of first conveyance unit 21 and second conveyance unit 26 while ensuring own safety.

In the first embodiment, first section 22a is located farthest from second conveyance unit 26 in first route 22 in the direction in which first conveyance unit 21 and second conveyance unit 26 are arranged. Third section 27a is located farthest from first conveyance unit 21 in second route 27 in the direction in which first conveyance unit 21 and second conveyance unit 26 are arranged.

With this configuration, the hand of the operator further hardly reaches second conveyance unit 26 from first opening 41 during the work to attach and detach the tool in first conveyance unit 21, and the hand of the operator further hardly reaches first conveyance unit 21 from second opening 42 during the work to attach and detach the tool in second conveyance unit 26. For this reason, the safety of the operator can be further enhanced during the work to attach and detach the tool.

Further, in the first embodiment, a center position of first opening 41 (a position of a center line 111 in FIG. 4) in the direction in which first conveyance unit 21 and second conveyance unit 26 are arranged is located on the far side from second section 22b with respect to first route 22 in first section 22a.

With this configuration, the hand of the operator further hardly reaches second conveyance unit 26 from first opening 41 during the work to attach and detach the tool in first conveyance unit 21. For this reason, the safety of the operator can be further enhanced during the work to attach and detach the tool.

Figure 5:
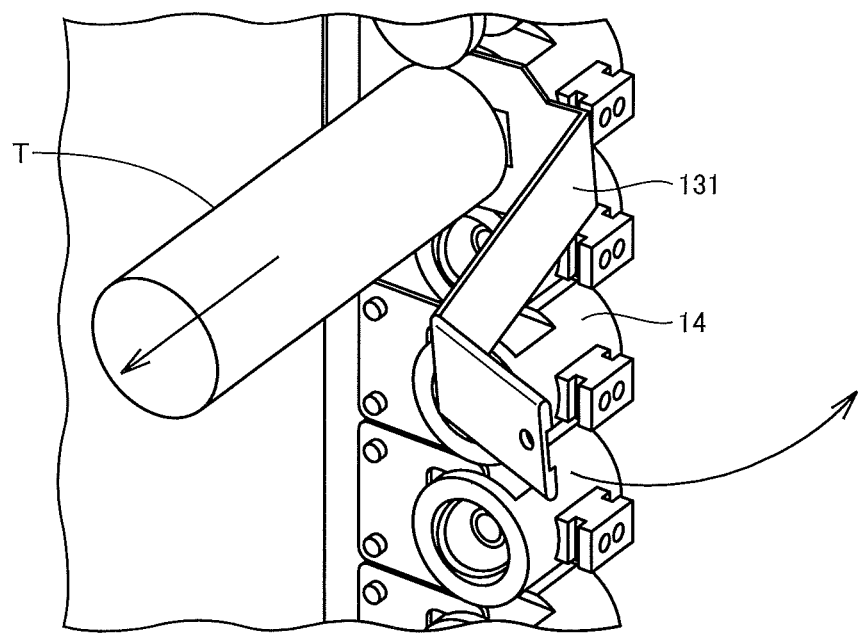
FIG. 5 is a perspective view illustrating a process of removing a tool using a jig.

FIG. 5 is a perspective view illustrating a process of removing the tool using a jig. With reference to FIGS. 4 and 5, the operator can remove the tool from first conveyance unit 21 or second conveyance unit 26 using a jig 131.

Specifically, the operator inserts jig 131 into a gap between the tool and tool pot 14, and presses jig 131 in a direction indicated by an arrow in FIG. 5 to remove the tool from tool pot 14. At this point, the operator handles jig 131 with a right hand, and grips the tool with a left hand.

A first jig insertion position 121 where jig 131 is inserted to remove the tool from first conveyance unit 21 is defined in first section 22a. A second jig insertion position 122 where jig 131 is inserted to remove the tool from second conveyance unit 26 is defined in third section 27a. When the opening surfaces of first opening 41 and second opening 42 are viewed from the front, first jig insertion position 121 is located on the right side of first section 22a, and second jig insertion position 122 is located on the right side of third section 27a.

First opening 41 is opened opposite a region including first jig insertion position 121. Second opening 42 is opened opposite a region including second jig insertion position 122. With this configuration, jig 131 is hardly interfered with cover body 31, so that workability can be improved when the tool is removed using jig 131.

Figure 6:
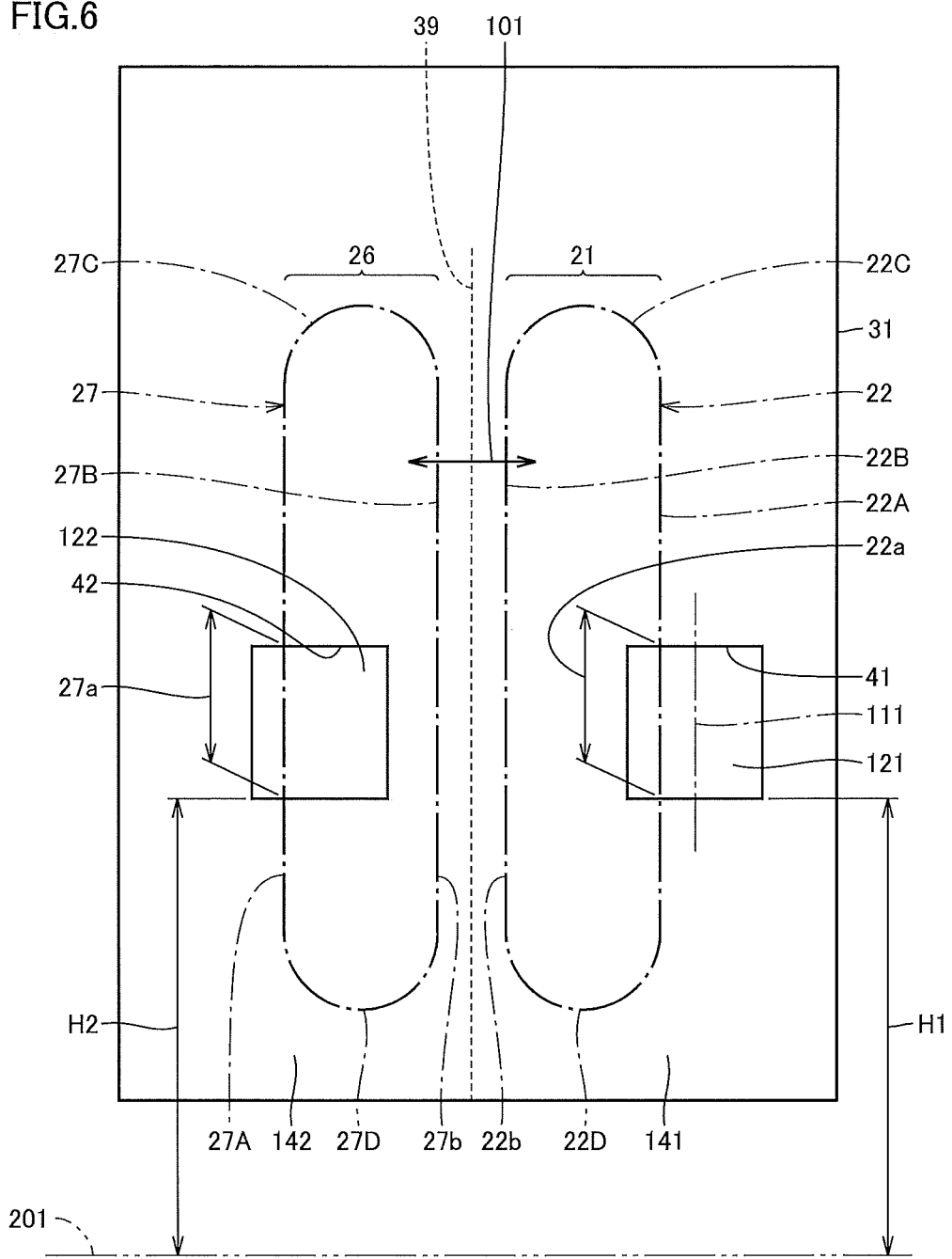
FIG. 6 is a front view illustrating a modification of the tool magazine in FIG. 4.

FIG. 6 is a front view illustrating a modification of the tool magazine in FIG. 4. With reference to FIG. 6, the tool magazine of the modification further includes a partition plate 39.

Partition plate 39 is provided in cover body 31. Partition plate 39 is provided in cover body 31 so as to partition a space in which first conveyance unit 21 is accommodated and a space in which second conveyance unit 26 is accommodated. Partition plate 39 is provided between straight portion 22B of first conveyance unit 21 and straight portion 27B of second conveyance unit 26 in the direction in which first conveyance unit 21 and second conveyance unit 26 are arranged.

With this configuration, first conveyance unit 21 and second conveyance unit 26 are separated from each other by partition plate 39, so that the safety of the operator can be further enhanced during the work to attach and detach the tool.

FIGS. 7 to 11 are front views illustrating first to fifth modifications of the layout of the first conveyance unit and the second conveyance unit in FIG. 4 and the positions of the first opening and the second opening.

Figure 7:
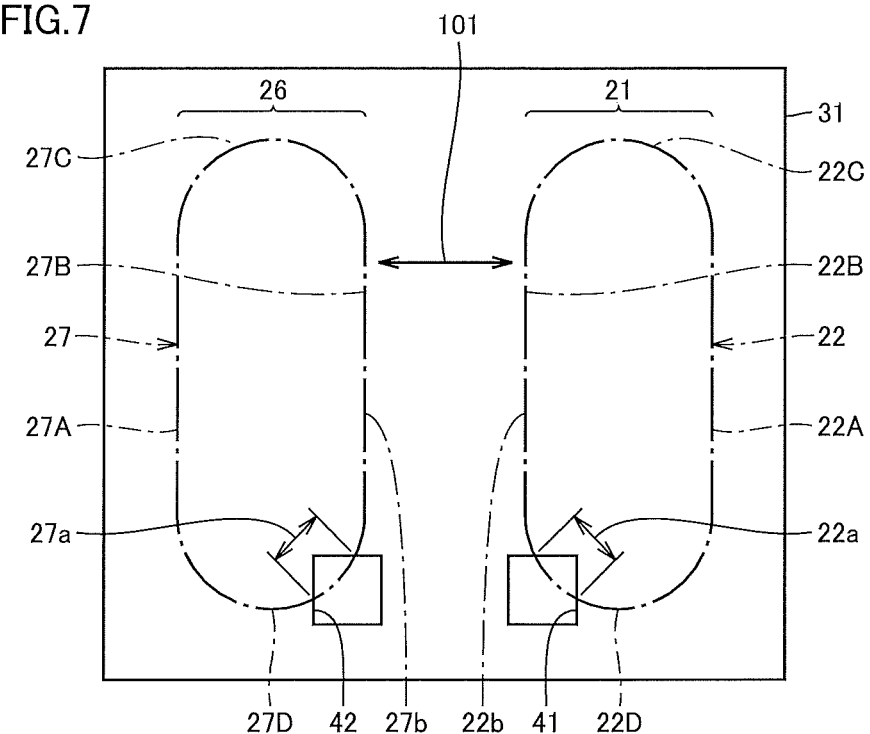
FIG. 7 is a front view illustrating a first modification of a layout of a first conveyance unit and a second conveyance unit illustrated in FIG. 4 and positions of a first opening and a second opening.

With reference to FIG. 7, first conveyance unit 21 and second conveyance unit 26 have the same layout as first conveyance unit 21 and second conveyance unit 26 in FIG. 4.

In the first modification, first section 22a corresponds to a part of inversion portion 22D. First section 22a is located between a bottom of inversion portion 22D and straight portion 22B. Second section 22b corresponds to straight portion 22B. Third section 27a corresponds to a part of inversion portion 27D. Third section 27a is located between a bottom of inversion portion 27D and straight portion 27B. Fourth section 27b corresponds to straight portion 27B.

First opening 41 used to attach and detach the tool to and from first conveyance unit 21 in first section 22a and second opening 42 used to attach and detach the tool to and from second conveyance unit 26 in third section 27a are provided in cover body 31.

Even in the first modification, in the direction in which first conveyance unit 21 and second conveyance unit 26 are arranged, second section 22b is located between first section 22a and second conveyance unit 26, and fourth section 27b is located between third section 27a and first conveyance unit 21, so that the safety of the operator can be ensured during the work to attach and detach the tool.

First opening 41 and second opening 42 are not limited to the positions described above. For example, first opening 41 and second opening 42 may be provided in inversion portion 22C and inversion portion 27C. First opening 41 and second opening 42 may be provided at positions that are asymmetric with respect to the center between first conveyance unit 21 and second conveyance unit 26.

Figure 8:
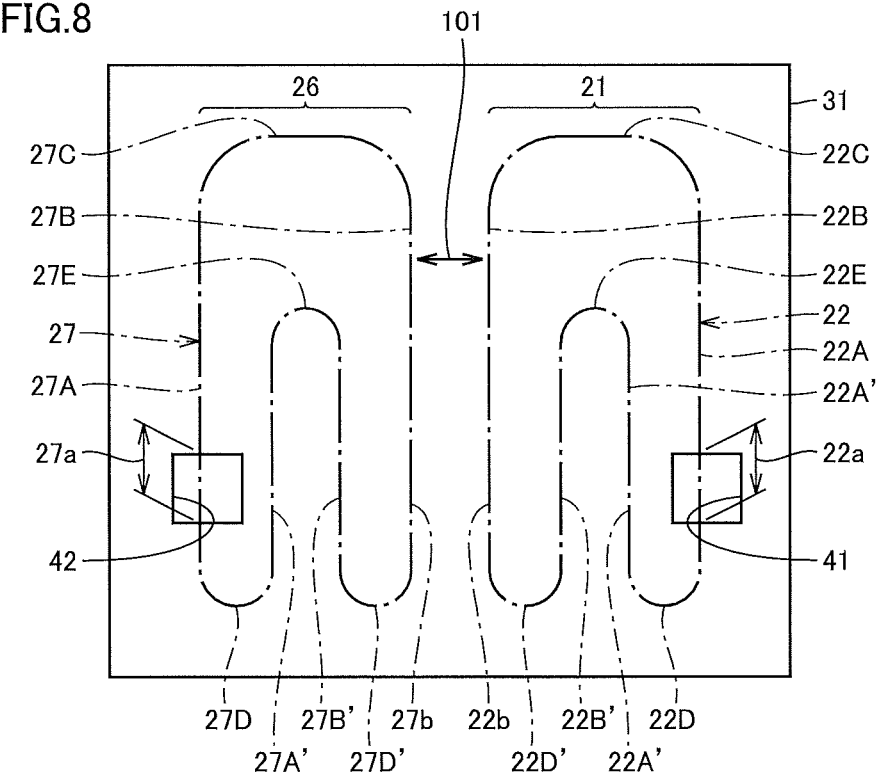
FIG. 8 is a front view illustrating a second modification of the layout of the first conveyance unit and the second conveyance unit in FIG. 4 and the positions of the first opening and the second opening.

With reference to FIGS. 8 and 9, in the second and third modifications, first route 22 includes straight portion 22A and a straight portion 22A', straight portion 22B and a straight portion 22W, inversion portion 22C, inversion portion 22D and an inversion portion 22D', and an inversion portion 22E as a constituent region thereof.

Straight portion 22A, straight portion 22A', straight portion 22B, and straight portion 22B' extend in parallel with one another. Straight portion 22A, straight portion 22A', straight portion 22B, and straight portion 22B' extend in the vertical direction. Straight portion 22A' and straight portion 22B' are located between straight portion 22A and straight portion 22B. Straight portion 22A' is located adjacent to straight portion 22A. Straight portion 22B' is located adjacent to straight portion 22B. Inversion portion 22C connects upper ends of straight portion 22A and straight portion 22B. Inversion portion 22D connects lower ends of straight portion 22A and straight portion 22A'. Inversion portion 22D' connects lower ends of straight portion 22B and straight portion 22B'. Inversion portion 22E connects upper ends of straight portion 22A' and straight portion 22B'. Inversion portion 22E is located between inversion portion 22C and inversion portions 22D and 22D' in the vertical direction.

Second route 27 includes straight portion 27A and a straight portion 27A', straight portion 27B and a straight portion 27B', inversion portion 27C, inversion portion 27D and an inversion portion 27D', and an inversion portion 27E as a constituent region thereof.

Straight portion 27A, straight portion 27A', straight portion 27B, and straight portion 27B' extend in parallel with one another. Straight portion 27A, straight portion 27A', straight portion 27B, and straight portion 27B' extend in the vertical direction. Straight portion 27A' and straight portion 27W are located between straight portion 27A and straight portion 27B. Straight portion 27A' is located adjacent to straight portion 27A. Straight portion 27B' is located adjacent to straight portion 27B. Inversion portion 27C connects upper ends of straight portion 27A and straight portion 27B. Inversion portion 27D connects lower ends of straight portion 27A and straight portion 27A'. Inversion portion 27D' connects lower ends of straight portion 27B and straight portion 27B'. Inversion portion 27E connects upper ends of straight portion 27A' and straight portion 27B'. Inversion portion 27E is located between inversion portion 27C and inversion portions 27D and 27D' in the vertical direction.

In the direction in which first conveyance unit 21 and second conveyance unit 26 are arranged, straight portion 22B of first route 22 and straight portion 27B of second route 27 are disposed adjacent to each other.

In the second modification of FIG. 8, first section 22a corresponds to a part of straight portion 22A. Second section 22b corresponds to straight portion 22B. Third section 27a corresponds to a part of straight portion 27A. Fourth section 27b corresponds to straight portion 27B. In the third modification of FIG. 9, first section 22a corresponds to a part of straight portion 22B'. Second section 22b corresponds to straight portion 22B. Third section 27a corresponds to a part of straight portion 27B'. Fourth section 27b corresponds to straight portion 27B.

First opening 41 used to attach and detach the tool to and from first conveyance unit 21 in first section 22a and second opening 42 used to attach and detach the tool to and from second conveyance unit 26 in third section 27a are provided in cover body 31.

Even in the third modification, in the direction in which first conveyance unit 21 and second conveyance unit 26 are arranged, second section 22b is located between first section 22a and second conveyance unit 26, and fourth section 27b is located between third section 27a and first conveyance unit 21, so that the safety of the operator can be ensured during the work to attach and detach the tool.

As illustrated in the third modification, the layout of first conveyance unit 21 and second conveyance unit 26 is not particularly limited.

With reference to FIG. 10, in the fourth modification, first conveyance unit 21 and second conveyance unit 26 are vertically arranged.

Straight portion 22A and straight portion 22B extend in parallel with each other. Straight portion 22A and straight portion 22B extend in the horizontal direction. Inversion portion 22C connects right ends of straight portion 22A and straight portion 22B. Inversion portion 22D connects left ends of straight portion 22A and straight portion 22B. Straight portion 27A and straight portion 27B extend in parallel with each other. Straight portion 27A and straight portion 27B extend in the horizontal direction. Inversion portion 27C connects right ends of straight portion 27A and straight portion 27B. Inversion portion 27D connects left ends of straight portion 27A and straight portion 27B.

Straight portion 22B of first route 22 and straight portion 27B of second route 27 are disposed adjacent to each other in the direction in which first conveyance unit 21 and second conveyance unit 26 are arranged (vertical direction).

First section 22a corresponds to a part of straight portion 22A. Second section 22b corresponds to straight portion 22B. Third section 27a corresponds to a part of straight portion 27A. Fourth section 27b corresponds to straight portion 27B.

First opening 41 used to attach and detach the tool to and from first conveyance unit 21 in first section 22a and second opening 42 used to attach and detach the tool to and from second conveyance unit 26 in third section 27a are provided in cover body 31.

Even in the fourth modification, in the direction in which first conveyance unit 21 and second conveyance unit 26 are arranged (vertical direction), second section 22b is located between first section 22a and second conveyance unit 26, and fourth section 27b is located between third section 27a and first conveyance unit 21, so that the safety of the operator can be ensured during the work to attach and detach the tool.

As illustrated in the fourth modification, the arrangement direction of first conveyance unit 21 and second conveyance unit 26 is not particularly limited.

Figure 11:
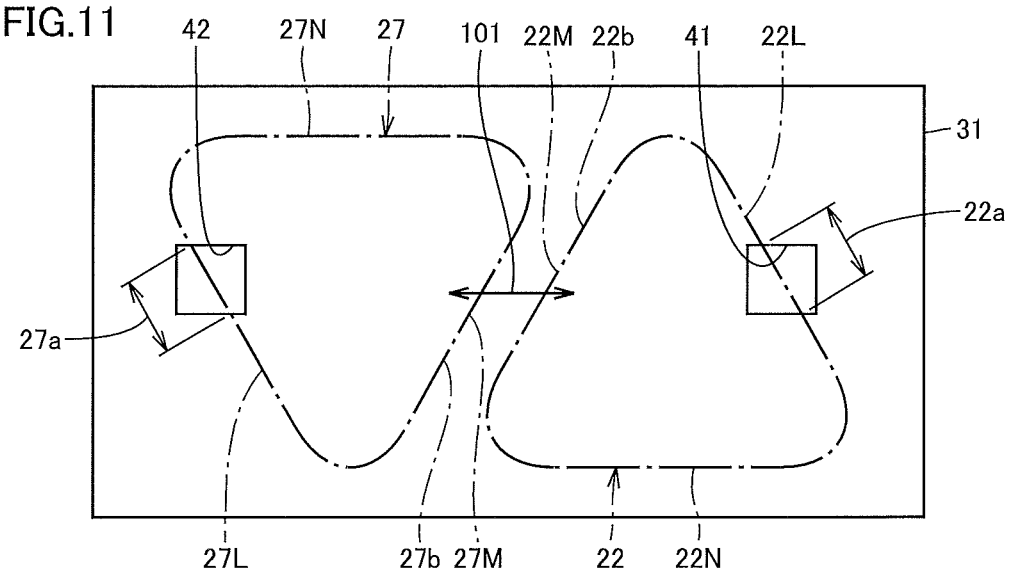
FIG. 11 is a front view illustrating a fifth modification of the layout of the first conveyance unit and the second conveyance unit in FIG. 4 and the positions of the first opening and the second opening.

With reference to FIG. 11, in the fifth modification, first conveyance unit 21 includes a straight portion 22L, a straight portion 22M, and a straight portion 22N as a constituent region thereof. Straight portion 22L, straight portion 22M, and straight portion 22N have a triangular shape in which a corner is curved. Straight portion 22N extends in the horizontal direction. Straight portion 22M and straight portion 22L extend diagonally upward from both ends of straight portion 22N, and intersect with each other above straight portion 22N.

Second conveyance unit 26 includes a straight portion 27L, a straight portion 27M, and a straight portion 27N as a constituent regions thereof. Straight portion 27L, straight portion 27M, and straight portion 27N have a triangular shape in which a corner is curved. Straight portion 27N extends in the horizontal direction. Straight portion 27M and straight portion 27L extend diagonally downward from both ends of straight portion 27N, and intersect with each other below straight portion 27N.

In the direction in which first conveyance unit 21 and second conveyance unit 26 are arranged, straight portion 22M of first route 22 and straight portion 27M of second route 27 are disposed adjacent to each other.

First section 22a corresponds to a part of straight portion 22L. Second section 22b corresponds to straight portion 22M. Third section 27a corresponds to a part of straight portion 27L. Fourth section 27b corresponds to straight portion 27M.

First opening 41 used to attach and detach the tool to and from first conveyance unit 21 in first section 22a and second opening 42 used to attach and detach the tool to and from second conveyance unit 26 in third section 27a are provided in cover body 31.

Even in the fifth modification, in the direction in which first conveyance unit 21 and second conveyance unit 26 are arranged, second section 22b is located between first section 22a and second conveyance unit 26, and fourth section 27b is located between third section 27a and first conveyance unit 21, so that the safety of the operator can be ensured during the work to attach and detach the tool.

To summarize the structure of tool magazine 10 as the conveyance device of the first embodiment of the present invention, tool magazine 10 of the first embodiment includes first conveyance unit 21 that detachably holds the plurality of tools as the conveyance object and conveys the plurality of tools along endless loop-shaped first route 22, second conveyance unit 26 provided side by side with first conveyance unit 21, second conveyance unit 26 detachably holding the plurality of tools and conveying the plurality of tools along endless loop-shaped second route 27, and cover body 31 forming the space in which first conveyance unit 21 and second conveyance unit 26 are accommodated. First route 22 includes first section 22a and second section 22b. Second route 27 includes third section 27a and fourth section 27b. First opening 41 used to attach and detach the tool to and from first conveyance unit 21 in first section 22a and second opening 42 used to attach and detach the tool to and from second conveyance unit 26 in third section 27a are provided in cover body 31. In the direction in which first conveyance unit 21 and second conveyance unit 26 are arranged, second section 22b is located between first section 22a and second conveyance unit 26. In the direction in which first conveyance unit 21 and second conveyance unit 26 are arranged, fourth section 27b is located between third section 27a and first conveyance unit 21.

In tool magazine 10 having the above configuration, a restriction can be avoided in timing of performing the work to attach and detach the tool in first conveyance unit 21 and second conveyance unit 26, and the work to attach and detach the tool can efficiently be performed.

The conveyance object is the tool in the first embodiment, but the present invention is not limited to this configuration. For example, the conveyance object may be a workpiece.

Second Embodiment

Figure 12:
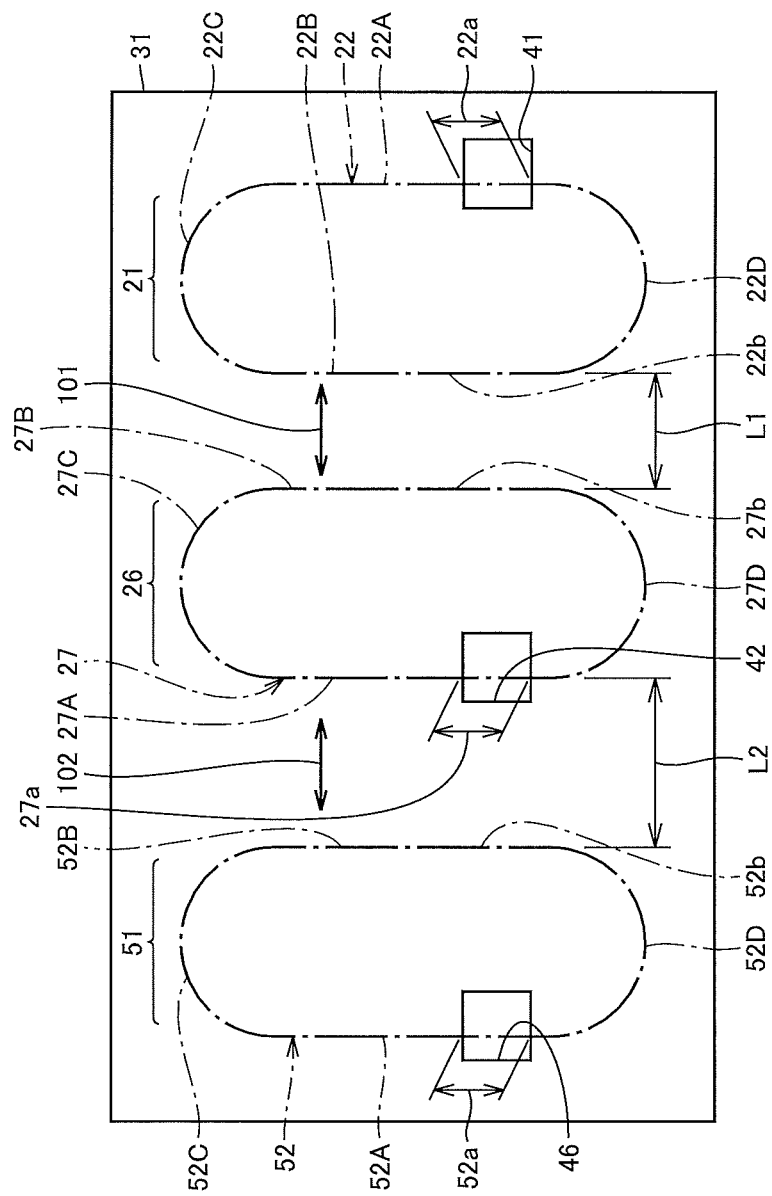
FIG. 12 is a front view illustrating a tool magazine according to a second embodiment of the present invention.

FIG. 12 is a front view illustrating a tool magazine according to a second embodiment of the present invention. FIG. 12 is a view corresponding to FIG. 4 in the first embodiment. The tool magazine of the second embodiment has basically the same structure as the tool magazine 10 of the first embodiment. Hereinafter, the description of the overlapping structure will not be repeated.

With reference to FIG. 12, tool magazine 10 of the second embodiment further includes a third conveyance unit 51.

Third conveyance unit 51 is configured to detachably hold the plurality of tools. Third conveyance unit 51 is configured to convey the plurality of tools along an endless loop-shaped third route 52.

Third conveyance unit 51 is provided independently of first conveyance unit 21 and second conveyance unit 26. Third conveyance unit 51 is provided side by side with second conveyance unit 26 in a direction indicated by an arrow 102 in FIG. 12 (hereinafter, the direction indicated by arrow 102 in FIG. 12 is also referred to as "a direction in which second conveyance unit 26 and third conveyance unit 51 are arranged"). Third conveyance unit 51 is provided on the opposite side to first conveyance unit 21 with second conveyance unit 26 interposed therebetween.

Cover body 31 forms a space in which third conveyance unit 51 is accommodated together with first conveyance unit 21 and second conveyance unit 26.

Third route 52 has a straight portion 52A, a straight portion 52B, an inversion portion 52C, and an inversion portion 52D as a constituent region thereof. Straight portion 52A and straight portion 52B extend in parallel with each other. Straight portion 52A and straight portion 52B extend in the vertical direction. Inversion portion 52C and inversion portion 52D extend in a semicircular shape. Inversion portion 52C connects upper ends of straight portion 52A and straight portion 52B. Inversion portion 52D connects lower ends of straight portion 52A and straight portion 52B. In inversion portion 52C and inversion portion 52D, the tool conveyance direction is inversed by 180°. The tool conveyance direction in straight portion 52A is opposite to the tool conveyance direction in straight portion 52B.

In the direction in which second conveyance unit 26 and third conveyance unit 51 are arranged, straight portion 27A of second route 27 and straight portion 52B of third route 52 are disposed adjacent to each other.

Third route 52 includes a fifth section 52a and a sixth section 52b. Fifth section 52a is a part of third route 52. Fifth section 52a corresponds to a part of straight portion 52A. Fifth section 52a is located at a position closer to inversion portion 52D than inversion portion 52C is in the vertical direction. Sixth section 52b is a section of a part of third route 52, and is located away from fifth section 52a. Sixth section 52b corresponds to straight portion 52B. In the direction in which second conveyance unit 26 and third conveyance unit 51 are arranged, sixth section 52b is located between fifth section 52a and second conveyance unit 26.

A third opening 46 is provided in cover body 31 in order to attach and detach the tool to and from third conveyance unit 51 in fifth section 52a. An interval L2 between second conveyance unit 26 and third conveyance unit 51 in the arrangement direction is larger than an interval L1 between first conveyance unit 21 and second conveyance unit 26 in the arrangement direction (L2>L1).

Third opening 46 is provided at the same level as first opening 41 and second opening 42.

Also in the second embodiment, in the direction in which second conveyance unit 26 and third conveyance unit 51 are arranged, sixth section 52b of third conveyance unit 51 is located between fifth section 52a of third conveyance unit 51 in which third opening 46 is provided and second conveyance unit 26. For this reason, even when the tool stored in third conveyance unit 51 is exchanged in timing of conveying the tool in second conveyance unit 26, the hand of the operator hardly reaches second conveyance unit 26 from third opening 46. For this reason, the safety of the operator can be ensured during the work to attach and detach the tool in third conveyance unit 51.

Interval L2 between second conveyance unit 26 and third conveyance unit 51 in the arrangement direction is larger than interval L1 between first conveyance unit 21 and second conveyance unit 26 in the arrangement direction. For this reason, even when the tool stored in second conveyance unit 26 is exchanged in timing of conveying the tool in third conveyance unit 51, the hand of the operator hardly reaches third conveyance unit 51 from second opening 42. For this reason, the safety of the operator can be ensured during the work to attach and detach the tool in second conveyance unit 26.

In the tool magazine of the second embodiment of the present invention having the above configuration, the same effects as the first embodiment can be obtained.

Third Embodiment

Figure 13:
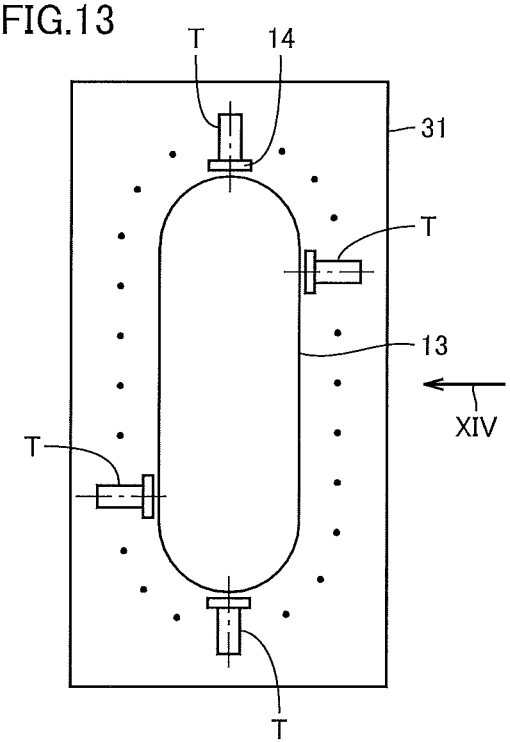
FIG. 13 is a front view illustrating a tool magazine according to a third embodiment of the present invention.
Figure 14:
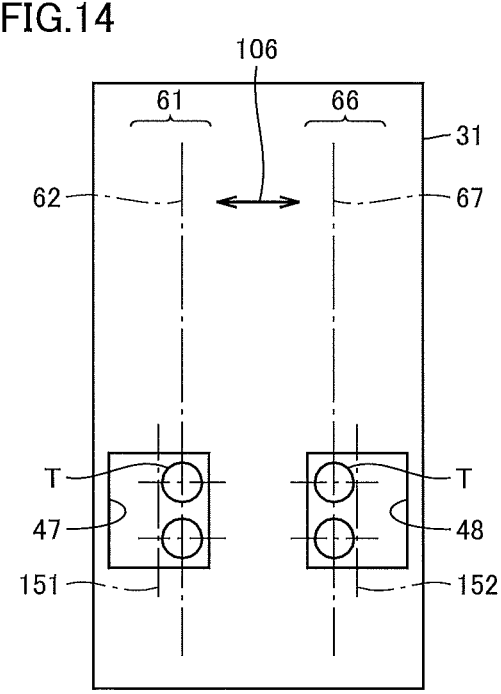
FIG. 14 is a side view illustrating the tool magazine as viewed from a direction indicated by an arrow XIV in FIG. 13.

FIG. 13 is a front view illustrating a tool magazine according to a third embodiment of the present invention. FIG. 14 is a side view illustrating the tool magazine as viewed from a direction indicated by an arrow XIV in FIG. 13. The tool magazine of the third embodiment has basically the same structure as the tool magazine 10 of the first embodiment. Hereinafter, the description of the overlapping structure will not be repeated.

With reference to FIGS. 13 and 14, the tool magazine of the third embodiment includes a first conveyance unit 61 and a second conveyance unit 66 instead of first conveyance unit 21 and second conveyance unit 26 of the first embodiment.

While the tool is held by tool pot 14, the axial center of the tool is parallel to the plane on which conveyance chain 13 is disposed in the loop shape. The tool is held in a state in which the axial center of the tool extends radially outward from conveyance chain 13.

First conveyance unit 61 is configured to detachably hold the plurality of tools. First conveyance unit 61 is configured to convey the plurality of tools along an endless loop-shaped first route 62. Second conveyance unit 66 is configured to detachably hold the plurality of tools. Second conveyance unit 66 is configured to convey the plurality of tools along an endless loop-shaped second route 67.

Second conveyance unit 66 is provided independently of first conveyance unit 61. Second conveyance unit 66 is provided side by side with first conveyance unit 61. Second conveyance unit 66 is provided side by side with first conveyance unit 61 in one horizontal direction. Second conveyance unit 66 is provided side by side with first conveyance unit 21 in the direction orthogonal to the plane on which conveyance chain 13 is disposed in the loop shape. Second conveyance unit 66 is provided side by side with first conveyance unit 61 in a direction indicated by an arrow 106 in FIG. 14 (hereinafter, the direction indicated by arrow 106 in FIG. 14 is also referred to as "a direction in which first conveyance unit 61 and second conveyance unit 66 are arranged").

A first opening 47 used to attach and detach the tool to and from first conveyance unit 61 and a second opening 48 used to attach and detach the tool to and from second conveyance unit 66 are provided in cover body 31. First opening 47 is provided opposite the tool held by first conveyance unit 61 in the axial direction of the tool. Second opening 48 is provided opposite the tool held by second conveyance unit 66 in the axial direction of the tool.

First opening 47 is provided so as to be shifted from first route 62 onto the side farther from second conveyance unit 66 in the direction in which first conveyance unit 61 and second conveyance unit 66 are arranged. The center position of first opening 47 in the direction in which first conveyance unit 61 and second conveyance unit 66 are arranged (the position of a center line 151 in FIG. 14) is located on the side farther from second route 67 with respect to first route 62.

Second opening 48 is provided so as to be shifted from second route 67 onto the side farther from first conveyance unit 61 in the direction in which first conveyance unit 61 and second conveyance unit 66 are arranged. The center position of second opening 48 in the direction in which first conveyance unit 61 and second conveyance unit 66 are arranged (the position of a center line 152 in FIG. 14) is located on the side farther from first route 62 with respect to second route 67.

In the tool magazine of the third embodiment, since first opening 47 is provided so as to be shifted from first route 62 onto the side farther from second conveyance unit 66 in the direction in which first conveyance unit 61 and second conveyance unit 66 are arranged, the hand of the operator hardly reaches second conveyance unit 66 from first opening 47 even when the tool stored in first conveyance unit 61 is exchanged in timing of conveying the tool in second conveyance unit 66.

Further, since second opening 48 is provided so as to be shifted from second route 67 onto the side farther from first conveyance unit 61 in the direction in which first conveyance unit 61 and second conveyance unit 66 are arranged, the hand of the operator hardly reaches first conveyance unit 61 from second opening 48 even when the tool stored in second conveyance unit 66 is exchanged in timing of conveying the tool in first conveyance unit 61.

Thus, even while the tool is conveyed in one of first conveyance unit 61 and second conveyance unit 66, the operator can perform the work to attach and detach the tool in the other of first conveyance unit 61 and second conveyance unit 66 while ensuring own safety.

As described above, to summarize the structure of the tool magazine as the conveyance device of the third embodiment of the present invention, the tool magazine of the third embodiment includes first conveyance unit 61 that detachably holds the plurality of tools as the conveyance object and conveys the plurality of tools along endless loop-shaped first route 62, second conveyance unit 66 provided side by side with first conveyance unit 61, second conveyance unit 66 detachably holding the plurality of tools and conveying the plurality of tools along endless loop-shaped second route 67, and cover body 31 forming the space in which first conveyance unit 61 and second conveyance unit 66 are accommodated. First opening 47 used to attach and detach the tool to and from first conveyance unit 61 and second opening 48 used to attach and detach the tool to and from second conveyance unit 66 are provided in cover body 31. First opening 47 is provided so as to be shifted from first route 62 onto the side farther from second conveyance unit 66 in the direction in which first conveyance unit 61 and second conveyance unit 66 are arranged. Second opening 48 is provided so as to be shifted from second route 67 onto the side farther from first conveyance unit 61 in the direction in which first conveyance unit 61 and second conveyance unit 66 are arranged.

In the tool magazine of the third embodiment of the present invention having the above configuration, the same effects as the first embodiment can be obtained.

The present invention will collectively be described below. According to one aspect of the present invention, a conveyance device includes: a first conveyance unit configured to detachably hold a plurality of conveyance objects and convey the plurality of conveyance objects along an endless loop-shaped first route; a second conveyance unit provided side by side with the first conveyance unit, the second conveyance unit detachably holding a plurality of conveyance objects and conveying the plurality of conveyance objects along an endless loop-shaped second route; and a cover body forming a space in which the first conveyance unit and the second conveyance unit are accommodated The first route includes a first section and a second section. The second route includes a third section and a fourth section. A first opening used to attach and detach each of the conveyance objects to and from the first conveyance unit in the first section and a second opening used to attach and detach each of the conveyance objects to and from the second conveyance unit in the third section are provided in the cover body. The second section is located between the first section and the second conveyance unit in a direction in which the first conveyance unit and the second conveyance unit are arranged. The fourth section is located between the third section and the first conveyance unit in the direction in which the first conveyance unit and the second conveyance unit are arranged.

In the conveyance device having the above configuration, the first opening provided in the first section is separated from the second conveyance unit with the second section interposed therebetween. For this reason, even while the plurality of conveyance objects are conveyed in the second conveyance unit, the conveyance objects can be attached and detached to and from the first conveyance unit through the first opening while the safety of the operator is ensured. The second opening provided in the third section is separated from the first conveyance unit with the fourth section interposed therebetween. For this reason, even while the plurality of conveyance objects are conveyed in the first conveyance unit, the conveyance objects can be attached and detached to and from the second conveyance unit through the second opening while the safety of the operator is ensured. Thus, according to the present invention, the work to attach and detach the conveyance object can efficiently be performed.

Preferably the first section is located farthest from the second conveyance unit in the first route in the direction in which the first conveyance unit and the second conveyance unit are arranged. The third section is located farthest from the first conveyance unit in the second route in the direction in which the first conveyance unit and the second conveyance unit are arranged.

In the conveyance device having the above configuration, the first opening is disposed farther from the second conveyance unit, and the second opening is disposed further from the first conveyance unit, so that the safety of the operator can be further enhanced during the work to attach and detach the conveyance object.

Preferably, when conveyance is performed in the forward direction or the reverse direction, the conveyance direction of the plurality of conveyance objects in the first section is opposite to the conveyance direction of the plurality of conveyance objects in the second section, and the conveyance direction of the plurality of conveyance objects in the third section is opposite to the conveyance direction of the plurality of conveyance objects in the fourth section.

In the conveyance device having the above configuration, the first opening can be disposed far from the second conveyance unit in the first conveyance unit in which the conveyance direction of the plurality of conveyance objects is inversed between the first section and the second section, and the second opening can be disposed far from the first conveyance unit in the second conveyance unit in which the conveyance direction of the plurality of conveyance objects is inversed between the third section and the fourth section.

Preferably the center position of the first opening in the direction in which the first conveyance unit and the second conveyance unit are arranged is located farther from the second section with respect to the first route in the first section.

In the conveyance device having the above configuration, the first opening is disposed farther from the second conveyance unit, so that the safety of the operator can be further enhanced when the conveyance object is attached and detached to and from the first conveyance unit.

Preferably the first jig insertion position where the jig is inserted in order to remove the conveyance object from the first conveyance unit is defined in the first section, and the second jig insertion position where the jig is inserted in order to remove the conveyance object from the second conveyance unit is defined in the third section. In this case, the first opening is opened opposite the region including the first jig insertion position, and the second opening is opened opposite the region including the second jig insertion position.

In the conveyance device having the above configuration, the workability can be improved when the conveyance object is removed from the first conveyance unit and the second conveyance unit using the jig.

Preferably the conveyance device further includes the partition plate provided in the cover body to partition the space in which the first conveyance unit is accommodated and the space in which the second conveyance unit is accommodated.

In the conveyance device having the above configuration, the safety of the operator can be further enhanced during the work to attach and detach the conveyance object.

Preferably the first opening and the second opening are provided at the same level.

In the conveyance device having the above configuration, the workability can be improved by bringing the installation conditions of the first opening and the second opening close to each other when the conveyance object is attached and detached to and from the first conveyance unit and the second conveyance unit.

Preferably the conveyance device further includes the third conveyance unit that is provided side by side with the second conveyance unit on the opposite side to the first conveyance unit with respect to the second conveyance unit, detachably holds the plurality of conveyance objects, and conveys the plurality of conveyance objects along the endless loop-shaped third route. The cover body forms the space in which the third conveyance unit is accommodated together with the first conveyance unit and the second conveyance unit. The third route includes the fifth section and the sixth section. The third opening is provided in the cover body in order to attach and detach the conveyance object to and from the third conveyance unit in the fifth section. The sixth section is located between the fifth section and the second conveyance unit in the direction in which the second conveyance unit and the third conveyance unit are arranged. The interval between the second conveyance unit and the third conveyance unit in the arrangement direction is larger than the interval between the first conveyance unit and the second conveyance unit in the arrangement direction.

In the conveyance device having the above configuration, the third opening provided in the fifth section is separated from the second conveyance unit with the sixth section interposed therebetween. For this reason, even while the plurality of conveyance objects are conveyed in the second conveyance unit, the conveyance objects can be attached and detached to and from the third conveyance unit through the third opening while the safety of the operator is ensured. The interval between the second conveyance unit and the third conveyance unit in the arrangement direction is larger than the interval between the first conveyance unit and the second conveyance unit in the arrangement direction. For this reason, even while the plurality of conveyance objects are conveyed in the third conveyance unit, the conveyance objects can be attached and detached to and from the second conveyance unit through the second opening while the safety of the operator is ensured.

According to another aspect of the present invention, a conveyance device includes: a first conveyance unit configured to detachably hold a plurality of conveyance objects and convey the plurality of conveyance objects along an endless loop-shaped first route; a second conveyance unit provided side by side with the first conveyance unit, the second conveyance unit detachably holding a plurality of conveyance objects and conveying the plurality of conveyance objects along an endless loop-shaped second route; and a cover body forming a space in which the first conveyance unit and the second conveyance unit are accommodated A first opening used to attach and detach each of the conveyance objects to and from the first conveyance unit and a second opening used to attach and detach each of the conveyance objects to and from the second conveyance unit are provided in the cover body. The first opening is provided to be shifted from the first route onto a side far from the second conveyance unit in a direction in which the first conveyance unit and the second conveyance unit are arranged. The second opening is provided to be shifted from the second route onto a side far from the first conveyance unit in the direction in which the first conveyance unit and the second conveyance unit are arranged.

In the conveyance device having the above configuration, the first opening is disposed farther from the second conveyance unit, and the second opening is disposed further from the first conveyance unit, so that the conveyance object can be attached and detached to and from the first conveyance unit and the second conveyance unit while the safety of the operator is ensured during the work to attach and detach the conveyance object.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

INDUSTRIAL APPLICABILITY

For example, the present invention is applied to the tool magazine.

REFERENCE SIGNS LIST

10: tool magazine, 12: magazine base, 13: conveyance chain, 14: tool pot, 15P: driving sprocket, 15Q: driven sprocket, 18: tool conveyance mechanism, 21, 61: first conveyance unit, 22, 62: first route, 22A, 22A', 22B, 22B', 22L, 22M, 22N, 27A, 27A', 27B, 27B', 27L, 27M, 27N, 52A, 52B: straight portion, 22C, 22D, 22E, 27C, 27D, 27E, 52C, 52D: inversion portion, 22a: first section, 22b: second section, 26, 66: second conveyance unit, 27, 67: second route, 27a: third section, 27b: fourth section, 31: cover body, 32: window, 33, 34, 35, 36, 37: operation button, 39: partition plate, 41, 47: first opening, 42, 48: second opening, 43: first door, 44: second door, 46: third opening, 51: third conveyance unit, 52: third route, 52a: fifth section, 52b: sixth section, 111, 151, 152: center line, 121: first jig insertion position, 122: second jig insertion position, 131: jig, 201: floor surface

The invention claimed is:
1. A conveyance device comprising:
a first conveyance unit configured to detachably hold a plurality of first conveyance objects and convey the plurality of first conveyance objects along an endless loop-shaped first route extending in a predetermined vertical plane;
a second conveyance unit provided side by side with the first conveyance unit, wherein the second conveyance unit is spaced apart from the first conveyance unit in a direction along the predetermined vertical plane, the second conveyance unit detachably holding a plurality of second conveyance objects and conveying the plurality of second conveyance objects along an endless loop-shaped second route extending in the predetermined vertical plane; and
a cover body forming a space in which the first conveyance unit and the second conveyance unit are accommodated,
wherein the first route includes a first section and a second section,
the second route includes a third section and a fourth section,
a first opening is provided in the cover body, the first opening is used to attach and detach each of the first conveyance objects to and from the first conveyance unit in the first section, and a second opening is provided in the cover body, the second opening is used to attach and detach each of the second conveyance objects to and from the second conveyance unit in the third section,
the second section is located between the first section and the second conveyance unit in the direction along the predetermined vertical plane, and the fourth section is located between the third section and the first conveyance unit in the direction along the predetermined vertical plane,
the first opening being formed as a through-hole in the cover body and the second opening being formed as a through-hole in the cover body,
wherein the first opening is provided opposite the first section in an axial direction of the first conveyance objects, wherein the second opening is provided opposite the third section in an axial direction of the second conveyance objects, and wherein the axial directions of the first and second conveyance objects are oriented orthogonal to the predetermined vertical plane.

2. The conveyance device according to claim 1, wherein with respect to the first section and the second section, the first section is located farthest from the second conveyance unit in the first route in the direction along the predetermined vertical plane, and with respect to the third section and the fourth section, the third section is located farthest from the first conveyance unit in the second route in the direction along the predetermined vertical plane.

3. The conveyance device according to claim 1, wherein when conveyance is performed in a forward direction or a reverse direction, a conveyance direction of the plurality of first conveyance objects in the first section is opposite to a conveyance direction of the plurality of first conveyance objects in the second section, and when the conveyance is performed in the forward direction or the reverse direction, a conveyance direction of the plurality of second conveyance objects in the third section is opposite to a conveyance direction of the plurality of second conveyance objects in the fourth section.

4. The conveyance device according to claim 1, wherein a center position of the first opening in the direction along the predetermined vertical plane, is located a first distance from the second section, wherein the first route in the first section is located a second distance from the second section, and wherein the first distance is greater than the second distance.

5. The conveyance device according to claim 1, wherein the first section includes a first jig insertion position where a jig is configured to be inserted in order to remove the first conveyance objects from the first conveyance unit, wherein the third section includes a second jig insertion position where a jig is configured to be inserted in order to remove the second conveyance objects from the second conveyance unit, and wherein the first opening is opened opposite a region including the first jig insertion position, and the second opening is opened opposite a region including the second jig insertion position.

6. The conveyance device according to claim 1, further comprising a partition plate provided in the cover body, the partition plate partitioning a space in which the first conveyance unit is accommodated and a space in which the second conveyance unit is accommodated.

7. The conveyance device according to claim 1, wherein the first opening and the second opening are provided at an identical level.

8. The conveyance device according to claim 1, further comprising a third conveyance unit provided side by side with the second conveyance unit on an opposite side to the first conveyance unit with the second conveyance unit interposed between the first conveyance unit and the third conveyance unit, the third conveyance unit detachably holding a plurality of third conveyance objects and conveying the plurality of third conveyance objects along an endless loop-shaped third route, wherein the cover body forms a space in which the third conveyance unit is accommodated together with the first conveyance unit and the second conveyance unit, the third route includes a fifth section and a sixth section, a third opening used to attach and detach the third conveyance objects to and from the third conveyance unit in the fifth section is provided in the cover body, the sixth section is located between the fifth section and the second conveyance unit in the direction along the predetermined vertical plane, and an interval between the second conveyance unit and the third conveyance unit in the direction along the predetermined vertical plane is larger than an interval between the first conveyance unit and the second conveyance unit in the direction along the predetermined vertical plane.

\* \* \* \* \*